(12) United States Patent
Shen (10) Patent No.: US 12,199,300 B2
(45) Date of Patent: Jan. 14, 2025

(54) BATTERY MODULE, MODULE COMBINATION, BATTERY PACK, AND ELECTRIC APPARATUS

(71) Applicant: CONTEMPORARY AMPEREX TECHNOLOGY CO., LIMITED, Ningde (CN)

(72) Inventor: Sheng Shen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/764,166

(22) Filed: Jul. 4, 2024

(65) Prior Publication Data

US 2024/0387929 A1 Nov. 21, 2024

Related U.S. Application Data

(63) Continuation of application No. PCT/CN2022/104585, filed on Jul. 8, 2022.

(30) Foreign Application Priority Data

Jan. 11, 2022 (CN) .................. 202220056791.X (51) Int. Cl.
*H01M 50/262* (2021.01)
*B60L 50/60* (2019.01)
*H01M 50/209* (2021.01)

(52) U.S. Cl.
CPC ....... *H01M 50/262* (2021.01); *H01M 50/209* (2021.01); *B60L 50/60* (2019.02); *H01M 2220/20* (2013.01)

(58) Field of Classification Search
CPC ............. H01M 50/262; H01M 50/209; H01M 2220/20; B60L 50/60

(Continued)

(56) References Cited

U.S. PATENT DOCUMENTS 11,124,076 B1 * 9/2021 Borghi .................. B62D 21/09
2013/0288094 A1 * 10/2013 Noh .................. H01M 10/0413
429/99

FOREIGN PATENT DOCUMENTS

CN 208522013 U 2/2019
CN 208889749 U 5/2019

(Continued)

OTHER PUBLICATIONS

International Search Report received in the corresponding International Application PCT/CN2022/104585, mailed Aug. 25, 2022.

(Continued)

*Primary Examiner* — Christian Roldan
*Assistant Examiner* — Robert Gene West
(74) *Attorney, Agent, or Firm* — Kilpatrick Townsend & Stockton LLP (57) ABSTRACT

This application provides a battery module, a module combination, a battery pack, and an electric apparatus, where the battery module includes a battery module body and a frame for fastening the battery module body. The frame includes a first side plate, a second side plate, a first end plate, and a second end plate, where the first side plate and the second side plate are disposed opposite each other and located on two sides of the battery module body respectively, and the side plates both extend from the battery module body. The first end plate and the second end plate are disposed opposite each other and located at two ends of the battery module body respectively, and an end portion of the end plate has an overlapping platform and a splicing portion protruding from the overlapping platform.

19 Claims, 5 Drawing Sheets

(58) Field of Classification Search
USPC .......................................................... 429/156
See application file for complete search history.

(56) References Cited

FOREIGN PATENT DOCUMENTS

| | | | |
|---|---|---|---|
| CN | 209641715 U | | 11/2019 |
| CN | 210467931 U | | 5/2020 |
| CN | 212991184 U | | 4/2021 |
| CN | 214013043 U | * | 8/2021 |
| CN | 216720169 U | | 6/2022 |
| JP | 2019016501 A | | 1/2019 |

OTHER PUBLICATIONS

Written Opinion of ISA received in the corresponding International Application PCT/CN2022/104585, mailed Aug. 25, 2022.

* cited by examiner

BATTERY MODULE, MODULE COMBINATION, BATTERY PACK, AND ELECTRIC APPARATUS

CROSS-REFERENCE TO RELATED APPLICATIONS

This application is a continuation of International Application No. PCT/CN2022/104585, filed on Jul. 8, 2022, which claims priority to Chinese Patent Application No. 202220056791.X, filed on Jan. 11, 2022 and entitled "BATTERY MODULE, MODULE COMBINATION, BATTERY PACK, AND ELECTRIC APPARATUS", which is incorporated herein by reference in its entirety.

TECHNICAL FIELD

This application relates to the field of battery technologies, and in particular, to a battery module, a module combination, a battery pack, and an electric apparatus.

BACKGROUND

Battery modules are increasingly widely used in electric apparatuses, such as electric vehicles. With the increasing demand for energy density of battery modules in electric apparatuses, the current single battery module is unable to fully meet energy demand of electric apparatuses. Therefore, to meet the energy demand of electric apparatuses, a typical method is to increase the volume of a single battery module. However, if the volume of a single battery module is too large, structural strength of the single battery module can hardly meet the mechanical performance requirements. In addition, the method of increasing the number of battery modules can also be adopted. However, during production, a plurality of battery modules need to be produced together and combined, resulting in poor manufacturability.

SUMMARY

This application provides a battery module, a module combination, a battery pack, and an electric apparatus. The battery module can meet mechanical performance requirements in terms of structural strength, and has good manufacturability and low costs.

According to a first aspect, this application provides a battery module including a battery module body and a frame for fastening the battery module body, where the frame includes:
  a first side plate and a second side plate, where the first side plate and the second side plate are disposed opposite each other and located on two sides of the battery module body respectively, and the side plates both extend from the battery module body; and
  a first end plate and a second end plate, where the first end plate and the second end plate are disposed opposite each other and located at two ends of the battery module body respectively, and an end portion of the end plate has an overlapping platform and a splicing portion protruding from the overlapping platform;
  where a portion of the side plate extending from the battery module body overlaps the overlapping platform and is connected to the end plate, and the splicing portion of the end plate is configured to be connected to a splicing portion of an end plate in another battery module.

In the embodiment of this application, since the battery module includes the frame, and the splicing portion of the end plate of the frame can be configured to be connected to the splicing portion of the end plate of another battery module, any number of battery modules can be connected through the frame to form a module combination with greater energy to meet energy demand of the electric apparatus. For a single battery module, its volume can be maintained in an appropriate range, with no need to increase the volume of the single battery module to meet the energy demand of the electric apparatus. This allows the structural strength of the single battery module to meet the mechanical performance requirements, and naturally, the structural strength of the module combination formed by connecting battery modules can also meet the mechanical performance requirements. In addition, the single battery module has good manufacturability and low manufacturing costs.

In some embodiments of this application, the splicing portion includes:
  a first surface, where the first surface is a surface facing the side plate;
  a second surface, where the second surface is a surface facing away from the side plate; and
  a third surface, where the third surface is a surface connecting the first surface and the second surface;
  where the second surface is an inclined flat surface or an inward arc-shaped surface. The splicing portion has a simple structure and is easy to manufacture. In addition, the structure of the splicing portion can improve the connection strength between the end plates.

In some embodiments of this application, a spacing is present between the first surface and a portion of the side plate extending from the battery module body. This facilitates the welding or gluing operations on the side plate and the end plate, enhancing the connection strength of the end plate and the side plate.

In some embodiments of this application, the third surface is a flat surface and perpendicular to the first surface. The provision of the flat surface can make the splicing portion easy to process and enhance its manufacturability. The splicing of the end plates is implemented through the third surface. As a flat surface, the third surface can enhance the connection strength between the battery module and other battery modules.

In some embodiments of this application, a height of the splicing portion protruding from the overlapping platform matches a thickness of the side plate, so that when the battery module is connected to another battery module, side plates in two adjacent battery modules are capable of fitting together. The side plates fitted together can further enhance the structural strength of the frames of the adjacent battery modules, thereby meeting the mechanical performance requirements.

In some embodiments of this application, the end plate is provided with a weight reduction hole running through the end plate along a width direction of the end plate. The provision of the weight reduction hole can achieve the lightweight of the battery module.

In some embodiments of this application, the end plate is provided with a bolt hole running through the end plate along a thickness direction of the end plate. Through the fit between the bolt hole and a bolt, the end plate of the battery module is fixedly connected to other components or apparatuses.

According to a second aspect, this application further provides a module combination including a plurality of battery modules according to any one of the foregoing embodiments, where adjacent two of the battery modules are a first battery module and a second battery module respectively, and a splicing portion of an end plate in the first battery module is aligned with and connected to a splicing portion of an end plate in the second battery module.

In the embodiment of this application, battery modules are connected together through the splicing portions of the end plates. When a frame of a single battery module is subjected to abnormal stress, the frames of other battery modules connected to that single battery module transfer the stress evenly to the frame of each battery module, preventing the frame of that single battery module from being damaged due to the abnormal stress. In addition, the splicing portion of the end plate of the frame can be configured to connect to the splicing portion of the end plate of another battery module. Therefore, any number of battery modules can be connected through the frame to form a module combination with greater energy to meet the energy demand of the electric apparatus. For a single battery module, its volume can be maintained in an appropriate range, with no need to increase the volume of the single battery module to meet the energy demand of the electric apparatus. This allows the structural strength of the single battery module to meet the mechanical performance requirements, and naturally, the structural strength of the module combination formed by connecting battery modules can also meet the mechanical performance requirements. In addition, the single battery module has good manufacturability and low manufacturing costs.

In some embodiments of this application, a side plate of the first battery module is fitted and connected to a side plate of the second battery module. The side plates of two adjacent battery modules are fitted and connected to each other, which can enhance the structural strength of the frames of the adjacent battery modules.

In some embodiments of this application, adjacent two of the splicing portions are connected by adhesive bonding or welding. This not only simplifies the connection between the splicing portions, but also further enhances the structural strength of the frames of the adjacent battery modules.

According to a third aspect, this application further provides a battery pack including the module combination according to the foregoing embodiments.

In the embodiment of this application, since the battery pack includes a plurality of battery modules according to the foregoing embodiments, the battery pack not only has good mechanical performance, but also has high energy density.

According to a fourth aspect, this application further provides an electric apparatus including the module combination according to any one of the foregoing embodiments or the battery pack according to the foregoing embodiment.

In the embodiments of this application, since the electric apparatus includes a plurality of battery modules or the battery pack, the electric apparatus has a strong endurance capacity.

BRIEF DESCRIPTION OF DRAWINGS

To describe the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figures (a) to (e) in FIG. 6 are schematic structural diagrams of a splicing portion in a battery module according to some embodiments of this application.

Reference signs in specific embodiments are as follows:
1. battery module;
10. battery module body;
20. frame;
21. first side plate;
211. first extension portion;
22. second side plate;
23. first end plate;
231. overlapping platform;
232. splicing portion;
2321. first surface;
2322. second surface;
2323. third surface;
233. weight reduction hole;
24. second end plate;
2. module combination;
3. battery pack; and
4. electric vehicle.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the descriptions of this application, it should be noted that, unless otherwise stated, "a plurality of" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be understood as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The words of orientation appearing in the following description are all directions shown in the drawings, and do not limit the specific structure of this disclosure. In the description of this application, it should also be noted that unless otherwise specified and defined explicitly, the terms "mounting", "connection", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

Battery modules are increasingly widely used in electric apparatuses, such as electric vehicles. With the increasing demand for energy density of battery modules in electric apparatuses, the current single battery module is unable to fully meet energy demand of electric apparatuses. Therefore, to meet the energy demand of electric apparatuses, a typical method is to increase the volume of a single battery module. However, if the volume of a single battery module is too large, structural strength of the single battery module can hardly meet the mechanical performance requirements. In addition, the method of increasing the number of battery modules can also be adopted. However, during production, a plurality of battery modules need to be produced together and combined, resulting in poor manufacturability.

To solve problems of low structural strength and poor manufacturability of a single battery module, this application provides a battery module. The battery module can meet mechanical performance requirements in terms of structural strength, and has good manufacturability and low costs.

For ease of description, the battery module of some embodiments of this application is used as an example for description of the following embodiments.

Referring to FIGS. 1 to 5, this application provides a battery module, where the battery module 1 includes a battery module body 10 and a frame 20 for fastening the battery module body 10. The frame 20 includes a first side plate 21, a second side plate 22, a first end plate 23, and a second end plate 24, where the first side plate 21 and the second side plate 22 are disposed opposite each other and located on two sides of the battery module body 10 respectively, and the first side plate 21 and the second side plate 22 both extend from the battery module body 10. The first end plate 23 and the second end plate 24 are disposed opposite each other and located at two ends of the battery module body 10 respectively, and an end portion of each end plate has an overlapping platform 231 and a splicing portion 232 protruding from the overlapping platform 231. In addition, a portion of the side plate extending from the battery module body 10 overlaps the overlapping platform 231 and is connected to the end plate, and the splicing portion 232 of the end plate is configured to be connected to a splicing portion 232 of an end plate in another battery module 1.

It can be understood that both the end portions on the same side of the first end plate 23 and the second end plate 24 have the overlapping platform 231 and the splicing portion 232 protruding from the overlapping platform 231. The overlapping platform 231 and the splicing portion 232 may be disposed at one end of the first end plate 23 and the second end plate 24, or disposed at two ends of the first end plate 23 and the second end plate 24. The specific arrangement may be selected according to actual needs.

Figure 1:
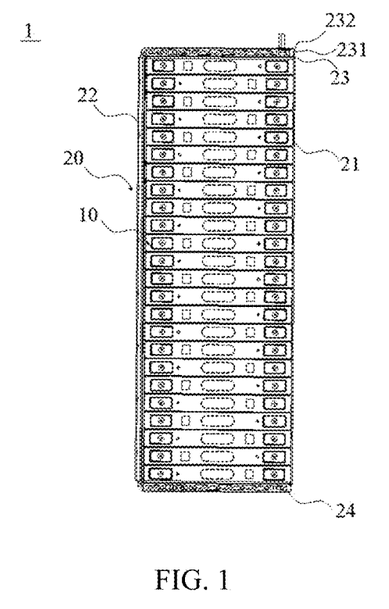
FIG. 1 is a schematic structural diagram of a battery module according to some embodiments of this application.
Figure 2:
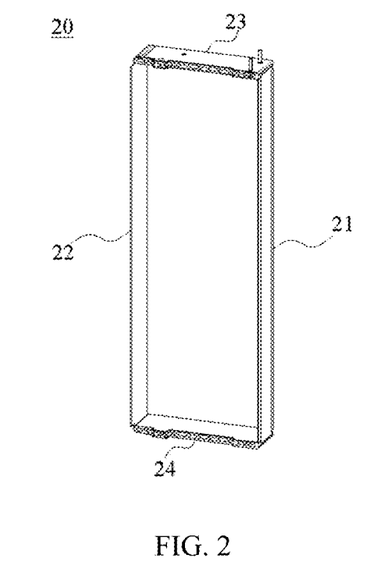
FIG. 2 is a schematic structural diagram of a frame in a battery module according to some embodiments of this application.

Referring to FIG. 2, in the embodiment of this application, the first side plate 21, the second side plate 22, the first end plate 23, and the second end plate 24 enclose the frame 20 in the battery module 1, so that the frame 20 has good structural strength and can be used to protect battery cells in the battery module body 10, and bear the internal expansion force of the battery cells and the external stress on the battery cells. In addition, the splicing portions 232 in the end plates of the frame 20 allow a plurality of battery modules 1 to be connected, and the plurality of battery modules 1 connected also have good structural strength and high energy density. During manufacturing and production, the end plate and the side plate in the frame 20 have a simple structure, good manufacturability, and low manufacturing costs.

In the embodiment of this application, the first side plate 21, the second side plate 22, the first end plate 23, and the second end plate 24 in the frame 20 are not limited to a specific material, and may be made of metal materials or plastic materials.

In some embodiments of this application, the first side plate 21, the second side plate 22, the first end plate 23, and the second end plate 24 in the frame 20 may be made of aluminum alloy, which allows the frame 20 to have good mechanical performance.

In some other embodiments of this application, the first side plate 21, the second side plate 22, the first end plate 23, and the second end plate 24 in the frame 20 may be made of plastic, which allows the frame 20 to be lighter in weight.

Figure 3:
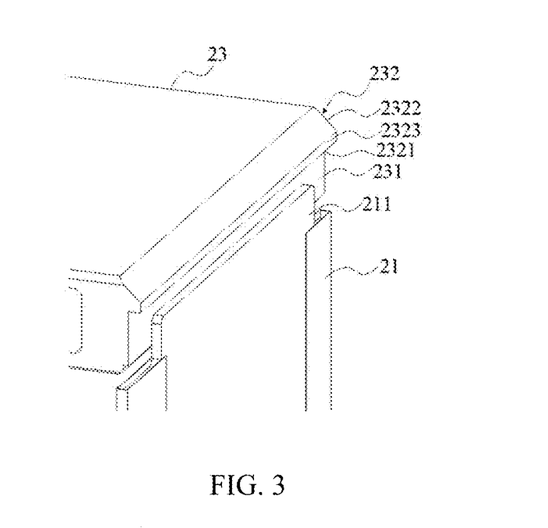
FIG. 3 is a schematic diagram of a connection between an end plate and a side plate in a battery module according to some embodiments of this application.

Referring to FIG. 3, in some embodiments of this application, the splicing portion 232 includes a first surface 2321, a second surface 2322, and a third surface 2323, where the first surface 2321 is an inner surface facing the side plate, the second surface 2322 is an outer surface facing away from the side plate, the second surface 2322 may be an inclined flat surface or an inward curved surface, and the third surface 2323 is a surface connecting the first surface 2321 and the second surface 2322. On the one hand, the splicing portion 232 has a simple structure and is easy to manufacture. On the other hand, the structure of the splicing portion 232 can enhance the structural strength of the frame 20, thereby making the frame 20 meet the mechanical performance requirements.

Figure 6:
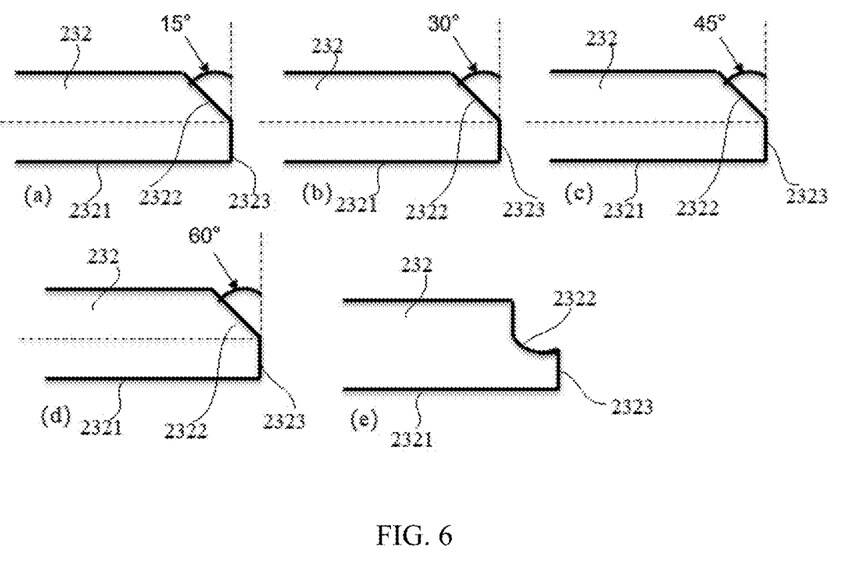

Further, in some embodiments of this application, the second surface 2322 of the splicing portion 232 may be an inclined flat surface. An inclined angle of this flat surface may be 15° to 90°, such as 15°, 30°, 45°, 60°, 75°, or 90°. For details, refer to figures (a) to (d) in FIG. 6. It can be understood that in the embodiments of this application the second surface 2322 and the third surface 2323 can form an angle of 15° to 90°, so that the second surfaces 2322 of two adjacent end plates can form an angle of 30° to 180°, thereby creating a space between the two adjacent end plates for welding or gluing. Welding or gluing the adjacent end plates through this space can further enhance the structural strength of the frame 20.

In some other embodiments of this application, the second surface 2322 of the splicing portion 232 may alternatively be an arc-shaped surface. For details, refer to figure (e) in FIG. 6. It can be understood that the entire or partial surface of the second surface 2322 is an arc-shaped surface, which provides sufficient space for welding or gluing operations between the end plates to enhance the connection between the end plates.

Referring to FIG. 3, in some embodiments of this application, a spacing is present between the first surface 2321 and a first extension portion 211 of the side plate extending from the battery module body 10. This facilitates the welding or gluing operations on the side plate and the end plate, enhancing the connection strength of the end plate and the side plate.

In some embodiments of this application, the first surface 2321 can be inwardly recessed to form a groove, and the first extension portion 211 of the side plate extending from the battery module body 10 matches the groove, able to be embedded into the groove to make the connection between the side plate and the end plate more secure.

In addition, in some embodiments of this application, the third surface 2323 is arranged as a flat surface and perpendicular to the first surface 2321. The provision of the flat surface makes the splicing portion 232 easier to process, enhancing the manufacturability. Moreover, the end plates are spliced through the third surface 2323 of the splicing portion 232. Arranged as a flat surface, the third surface 2323 can enhance the connection strength between the battery module 1 and other battery modules 1.

Further, in some embodiments of this application, a height of the splicing portion 232 protruding from the overlapping platform 231 matches a thickness of the side plate, so that when the battery module 1 is connected to another battery module 1, the side plates in two adjacent battery modules 1 are capable of fitting together. It can be understood that the splicing portions 232 of the adjacent end plates can be connected to form an insertion slot. The insertion slot can accommodate the side plates of two adjacent battery modules 1, and the side plates are fitted and connected to each other. In the embodiment, the shape of the insertion slot is not specifically limited, and may be triangular, U-shaped, rectangular, or the like.

In some of the foregoing embodiments, the width of the insertion slot matches the thickness of the two side plates, and the depth of the insertion slot matches the length of the first extension portion 211 of the side plate extending from the battery module body 10. This not only allows the side plates of two adjacent battery modules 1 to fit together, but also allows the side plate to fit to the overlapping platform 231 and the first surface 2321 of the splicing portion 232, thereby further enhancing the structural strength of the frame 20 and achieving the purpose of meeting mechanical performance requirements.

While meeting the mechanical performance requirements, the frame 20 in the battery module 1 also needs to be as light as possible. In some embodiments of this application, the end plate is provided with a weight reduction hole 233 running through the end plate along a width direction of the end plate. The provision of the weight reduction hole 233 can achieve the lightweight of the battery module 1.

Figure 4:
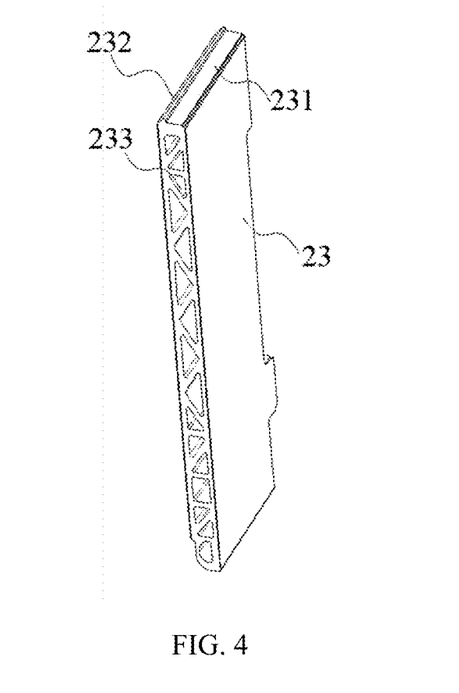
FIG. 4 is a schematic structural diagram of an end plate in a battery module according to some embodiments of this application.
Figure 5:
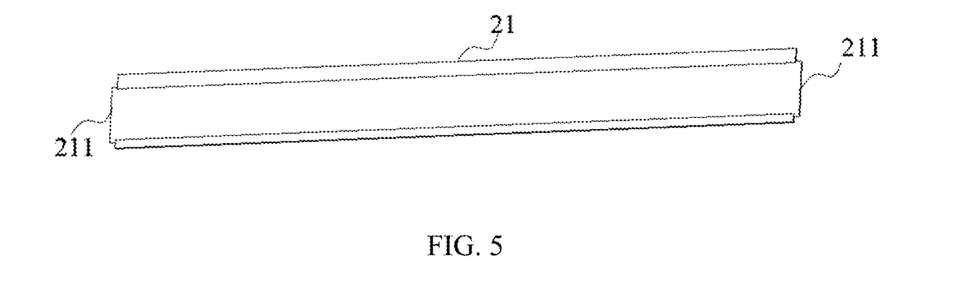
FIG. 5 is a schematic structural diagram of a side plate in a battery module according to some embodiments of this application.

In some of the foregoing embodiments, the shape and quantity of the weight reduction hole 233 are not specifically limited, and can be designed according to manufacturing processes and requirements. For example, the weight reduction hole 233 may be square, circular, triangular, or the like. In some specific embodiments of this application, as shown in FIG. 4, the weight reduction hole 233 is triangular, and a plurality of weight reduction holes 233 are spaced apart.

The battery module 1 needs to be fastened during mounting. In some embodiments of this application, the end plate is provided with a bolt hole running through the end plate along a thickness direction of the end plate. Through the fit between the bolt hole and a bolt, the end plate of the battery module 1 can be fixedly connected to other components or apparatuses.

Based on the same inventive concept, this application further provides a module combination 2. Referring to the FIG. 7, the module combination 2 includes a plurality of battery modules 1 according to any one of the foregoing embodiments, where adjacent two of the battery modules 1 are a first battery module and a second battery module, and a splicing portion 232 of an end plate in the first battery module is aligned with and connected to a splicing portion 232 of an end plate in the second battery module.

Figure 7:
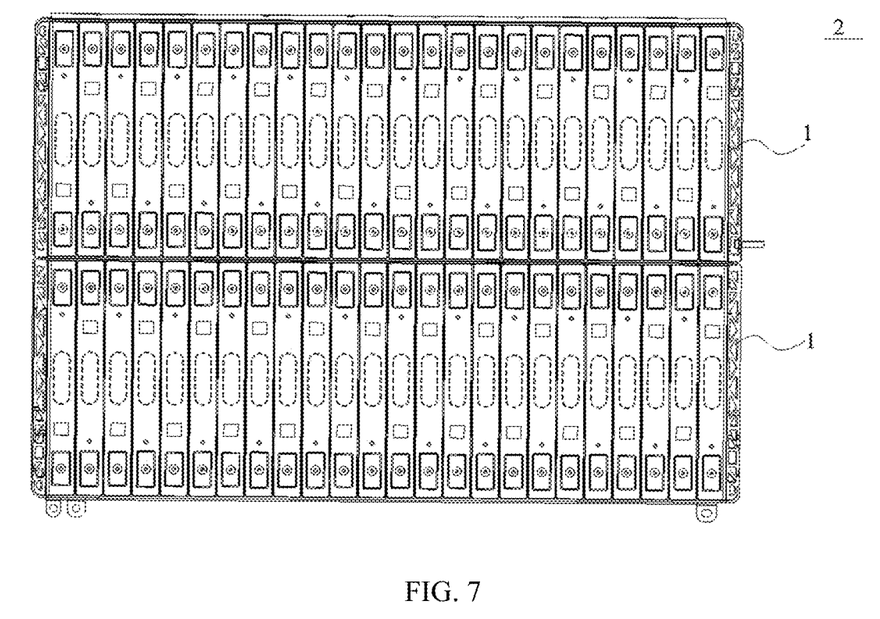
FIG. 7 is a schematic structural diagram of a module combination according to some embodiments of this application.

In the embodiment of this application, the battery modules 1 are connected together through the splicing portions 232 of the end plates. When a frame 20 of a single battery module 1 is subjected to abnormal stress, the frames 20 of other battery modules 1 connected to that single battery module 1 transfer the stress evenly to the frame 20 of each battery module 1, preventing the frame 20 of that single battery module 1 from being damaged due to the abnormal stress. In addition, the splicing portion 232 of the end plate of the frame 20 can be configured to connect to the splicing portion 232 of the end plate of another battery module 1. Therefore, any number of battery modules 1 can be connected through the frame 20 to form a module combination 2 with greater energy to meet the energy demand of the electric apparatus. For a single battery module 1, its volume can be maintained in an appropriate range, with no need to increase the volume of the single battery module 1 to meet the energy demand of the electric apparatus. This allows the structural strength of the single battery module 1 to meet the mechanical performance requirements, and naturally, the structural strength of the module combination 2 formed by connecting battery modules 1 can also meet the mechanical performance requirements.

Figure 8:
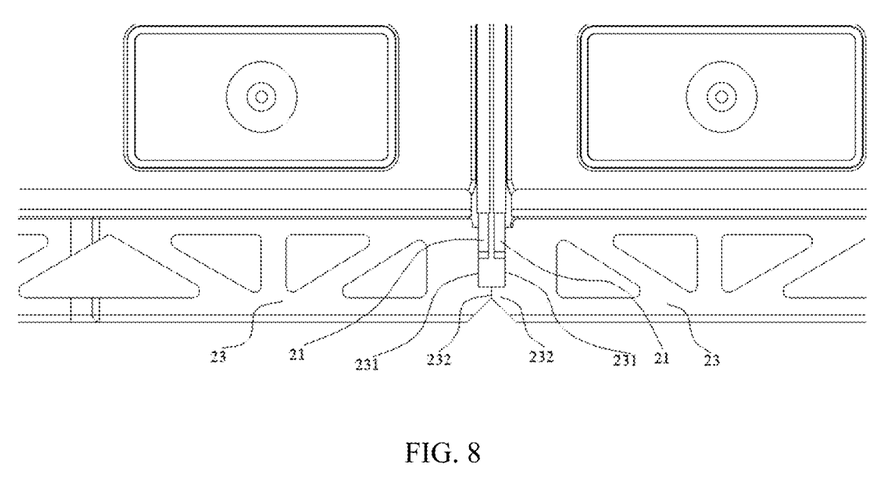
FIG. 8 is a schematic diagram of a connection between an end plate and a side plate in a module combination according to some embodiments of this application.

Referring to FIG. 8, in some embodiments of this application, a side plate of the first battery module is fitted and connected to a side plate of the second battery module. The side plates of two adjacent battery modules 1 are fitted and connected to each other, which can enhance the structural strength of the frames 20 of the adjacent battery modules 1.

Still referring to FIG. 8, in some embodiments of this application, the two side plates are fitted to their respective overlapping platforms 231 and the first surfaces 2321 of the splicing portions 232, further enhancing the structural strength of the frame 20 of the battery module 1 and achieving the purposes of meeting the mechanical performance requirements.

Still referring to FIG. 8, in some embodiments of this application, adjacent two of the splicing portions 232 are connected by adhesive bonding or welding. This not only simplifies the connection between the splicing portions 232, but also further enhances the structural strength of the frames 20 of the adjacent battery modules 1.

In some specific embodiments of this application, two adjacent splicing portions 232 are connected by adhesive bonding. Such connection method has low requirements for operators and is easy to operate.

Figure 9:
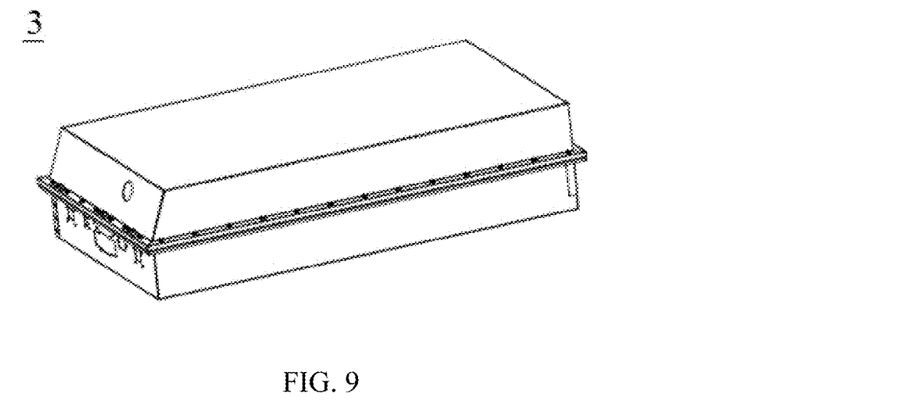
FIG. 9 is a schematic structural diagram of a battery pack according to some embodiments of this application.

Based on the same inventive concept, this application provides a battery pack 3. Referring to FIG. 9, the battery pack 3 includes the module combination 2 according to the foregoing embodiments.

The battery pack 3 provided in this application may be used without limitation in electric apparatuses such as vehicles, ships, or aircrafts. The battery module 1, module combination 2, battery pack 3, and the like disclosed in this application may be used to constitute a power supply system of the electric apparatus. In this way, the endurance capacity of the electric apparatus can be improved.

Based on the same inventive concept, this application provides an electric apparatus, where the electric apparatus includes a module combination 2 or a battery pack 3. The electric apparatus may be but is not limited to a mobile phone, a tablet, a laptop computer, an electric toy, an electric tool, an electric bicycle, an electric vehicle, a ship, a spacecraft, or the like. The electric toy may be a fixed or mobile electric toy, for example, a game console, an electric toy vehicle, an electric toy ship, and an electric toy airplane. The spacecraft may include an airplane, a rocket, a space shuttle, a spaceship, and the like.

Figure 10:
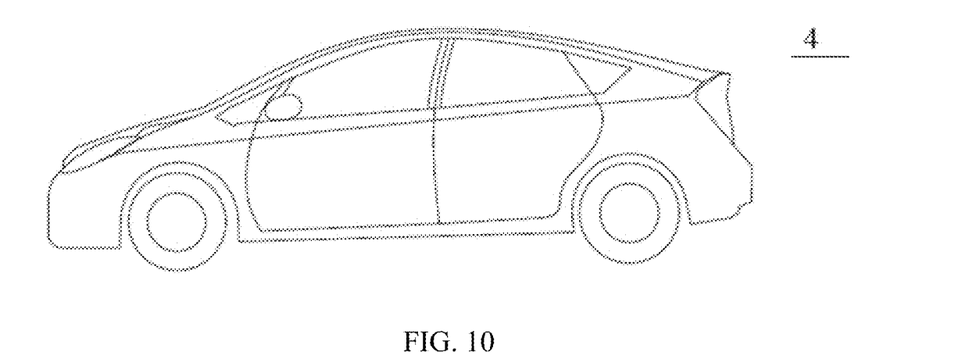
FIG. 10 is a schematic structural diagram of an electric apparatus according to some embodiments of this application.

In some embodiments of this application, the foregoing electric apparatus is an electric vehicle 4, as shown in FIG. 10.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all embodiments falling in the scope of the claims.

What is claimed is:

1. A battery module, comprising a battery module body and a frame for fastening the battery module body, wherein the frame comprises:
   a first side plate and a second side plate, wherein the first side plate and the second side plate are disposed opposite each other and located on two sides of the battery module body respectively, and the first side plate and the second side plate both extend from the battery module body; and
   a first end plate and a second end plate, wherein the first end plate and the second end plate are disposed opposite each other and located at two ends of the battery module body respectively, and an end portion of each one of the first end plate and the second end plate has an overlapping platform and a splicing portion protruding from the overlapping platform;
   wherein a portion of the first side plate extending from the battery module body overlaps the overlapping platform and is connected to the first end plate, and the splicing portion of the first end plate is configured to be connected to a splicing portion of a first end plate of another battery module,
   wherein a height of the splicing portion protruding from the overlapping platform matches a thickness of the first side plate and the second side plate, so that when one of the battery module is adjacent and connected to another one of the battery module, the first side plates of the two adjacent battery modules are capable of fitting together.

2. The battery module according to claim 1, wherein the splicing portion comprises:
   a first surface, wherein the first surface is a surface facing the first side plate;
   a second surface, wherein the second surface is a surface facing away from first side plate; and
   a third surface, wherein the third surface is a surface connecting the first surface and the second surface;
   wherein the second surface is an inclined flat surface or an inward arc-shaped surface.

3. The battery module according to claim 2, wherein a spacing is present between the first surface and the portion of the first side plate extending from the battery module body.

4. The battery module according to claim 2, wherein the third surface is a flat surface and perpendicular to the first surface.

5. The battery module according to claim 1, wherein the first end plate is provided with a weight reduction hole running through the first end plate along a width direction of the first end plate.

6. The battery module according to claim 1, wherein the first end plate is provided with a bolt hole running through the first end plate along a thickness direction of the first end plate.

7. A module combination, comprising a plurality of battery modules wherein the plurality of battery modules comprises two adjacent battery modules comprising a first battery module and a second battery module, each one of the first battery module and the second battery module further comprises a battery module body and a frame for fastening the battery module body, wherein the frame comprises:
   a first side plate and a second side plate, wherein the first side plate and the second side plate are disposed opposite each other and located on two sides of the battery module body respectively, and the first side plate and the second side plate both extend from the battery module body; and
   a first end plate and a second end plate, wherein the first end plate and the second end plate are disposed opposite each other and located at two ends of the battery module body respectively, and an end portion of the first end plate has an overlapping platform and a splicing portion protruding from the overlapping platform;
   wherein, in each one of the first battery module and the second battery module, a portion of the first side plate extending from the battery module body overlaps the overlapping platform and is connected to the first end plate, and the splicing portion of the first end plate of the first battery module is configured to be aligned with and connected to the splicing portion of the first end plate of the second battery module,
   wherein, in each one of the first battery module and the second battery module, a height of the splicing portion protruding from the overlapping platform matches a thickness of the first side plate, so that the first side plates of the first battery module and the second battery module are fitted together and connected to each other.

8. The module combination according to claim 7, wherein the splicing portions of the first battery module and the second battery module are connected by adhesive bonding or welding.

9. A battery pack, comprising the module combination according to claim 7.

10. An electric apparatus, comprising the module combination according to claim 7.

11. A battery module, comprising a battery module body and a frame for fastening the battery module body, wherein the frame comprises:
    a first side plate and a second side plate, wherein the first side plate and the second side plate are disposed opposite each other and located on two sides of the battery module body respectively, and the first side plate and the second side plate both extend from the battery module body; and a first end plate and a second end plate, wherein the first end plate and the second end plate are disposed opposite each other and located at two ends of the battery module body respectively, and an end portion of each one of the first end plate and the second end plate has an overlapping platform and a splicing portion protruding from the overlapping platform;

wherein a portion of the first side plate extending from the battery module body overlaps the overlapping platform and is connected to the first end plate, and the splicing portion of the first end plate is configured to be aligned with and connected to a splicing portion of a first end plate of another battery module, wherein the splicing portion comprises:
- a first surface, wherein the first surface is a surface facing the first side plate and the second side plate;
- a second surface, wherein the second surface is a surface facing away from first side plate and the second side plate; and
- a third surface, wherein the third surface is a surface connecting the first surface and the second surface;

wherein a spacing is present between the first surface and the portion of the side plate extending from the battery module body.

12. The battery module according to claim 11, wherein the second surface is an inclined flat surface or an inward arc-shaped surface.

13. The battery module according to claim 11, wherein the third surface is a flat surface and perpendicular to the first surface.

14. The battery module according to claim 11, wherein a height of the splicing portion protruding from the overlapping platform matches a thickness of the first side plate, so that when one of the battery module is adjacent and connected to another one of the battery module, the first side plates of the two adjacent battery modules are capable of fitting together.

15. The battery module according to claim 11, wherein the first end plate is provided with a weight reduction hole running through the first end plate along a width direction of the first end plate.

16. The battery module according to claim 11, wherein the first end plate is provided with a bolt hole running through the first end plate along a thickness direction of the first end plate.

17. A module combination, comprising a plurality of battery modules, each one of the plurality of battery modules according to claim 11, wherein the plurality of battery modules comprises a first battery module and a second battery module adjacent to the first battery module, and the splicing portion of the first end plate of the first battery module is aligned with and connected to the splicing portion of the first end plate of the second battery module.

18. The module combination according to claim 17, wherein the first side plate of the first battery module is fitted and connected to the side plate of the second battery module.

19. The module combination according to claim 17, wherein the splicing portions of the first battery module and the second battery module are connected by adhesive bonding or welding.

* * * * *